April 9, 1935. P. PAUTOU 1,997,391
STORAGE BATTERY
Filed May 12, 1931

Inventor
Paul Pautou
per
Attorney

Patented Apr. 9, 1935

1,997,391

UNITED STATES PATENT OFFICE 1,997,391

STORAGE BATTERY

Paul Pautou, Colombes, France

Application May 12, 1931, Serial No. 536,727
In France May 16, 1930

4 Claims. (Cl. 136—143)

This invention relates to improvements to storage batteries, and is in the nature of an improvement over the copending application of Paul Pautou and Louis Cauquil filed June 6, 1929, bearing the Serial No. 368,884. The present application is also the parent case with respect to the copending divisional application of the applicant filed May 12, 1932, and bearing the Serial No. 610,752.

In modern motor carriages which use storage batteries on the one hand for starting their motors, and on the other hand for the ignition of such motor, it is absolutely necessary to obtain for such batteries the maximum power for a cost as low as possible. On another hand, owing to the fact that the starting electric motor causes the storage battery to be very quickly unloaded, the discharge of such battery being even in some cases brought to a very high degree by repeated attempts for starting the motor of the car, it frequently happens that when the gasoline motor has been at last put in motion, the tension between the terminals of said battery is no longer sufficient for providing for the ignition of the gasoline motor.

The storage battery according to my invention which remedies those defects comprises on the one hand a particular shape of separators which maintain the positive and the negative electrodes or plates of the accumulator at a convenient distance apart while leaving practically the whole surface of the positive plate in contact with the electrolyte. The working surface is thus increased and, consequently, the capacity of the accumulator. On the other hand, every positive plate has a part of its surface that is not located in front of an adjacent negative plate, and which part thus maintains sufficient reserve power to produce the ignition current, even after difficult starting of the gasoline motor.

It is a feature of the invention that the separators herein which maintain the positive and negative plates at a convenient spaced distance preferably consist of resilient rubber as for example, gum rubber or caoutchouc in the form of bands or straps. These rubber bands are placed into their respectively proper positions upon the dry plates before the latter are immersed or put into the electrolyte containers, said plates in their dry condition being of course so conveniently accessible and may be so readily handled that there is small danger of injuring the same. Obviously it is not necessary that the elastic bands have any great tension in the dry condition of the plates, it is entirely sufficient that the tension is only effective to hold the bands in position so that they may space adjacent plates apart. The tension of the bands is in fact deliberately predetermined to be just so slight as to disappear completely upon immersion in the electrolyte of a battery, the buoyant effect of the electrolyte and the actual position of the bands being then sufficient to hold them in position, especially if the plates are notched upon the edges to receive the bands. As the bands in the electrolyte are not under any tension whatever, there is of course no tendency to strain the same and breakage from such cause is of course out of the question. The plates with their slack rubber bands are thus conveniently spaced apart in electrolyte and their spacing may be considered permanent as the bands will remain in position in view of any tendency thereof to break and drop off.

In the accompanying drawing which shows diagrammatical examples of a preferred form of an accumulator according to my invention:—

Figure 3:
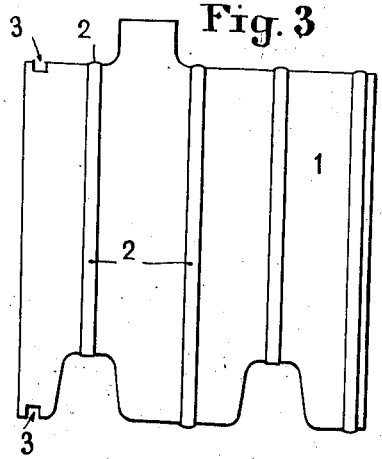
Fig. 3 shows a positive plate with the arrangement of the separating bands.
Figure 4:
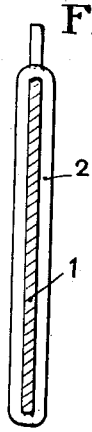
Fig. 4 is a side view of Fig. 3.

According to my invention, and in the preferred form of same, each positive plate such as 1, which possesses a convenient area is provided with a convenient number of separators consisting of insulating straps 2 of natural or artificial caoutchouc, the length of which is conveniently designed so that such straps have when dry a sufficient tension for securing their position in notches 3 (Fig. 3) which are provided on every edge of the positive plate 1.

The tension of the india-rubber straps is, however, practically eliminated when the plate assembly is submerged and brought into service, owing to the fact that the india-rubber or caoutchouc tends to expand when immersed in the electrolyte of the storage battery. In other words, the insulating bands loose their tension when in contact with the electrolyte and are thus rendered inert and free of any danger of fracture.

The straps 2, therefore, may be placed in the position which they are to occupy on the positive plates when dry and will remain in such position even when the plate is subjected to handling or manipulation due to the tension of said straps retaining the same in notches 3.

When the positive plates, however, have been immersed in the electrolyte for a while, the elastic caoutchouc straps grow longer and are thus deprived of their whole tension. The straps then simply constitute inert bands which are located in notches 3 of the positive plates 1, and which no longer run the risk of breaking as they are then absolutely deprived of tension. The function of such straps is to keep the positive and the negative plates at a convenient distance apart without said straps being strained in order to remain in the position which have been given on the positive plates. Such an arrangement positively maintains the desired distance between the positive and the negative plates by means of parts which are not liable to be disturbed or displaced, such parts having been put in place on the positive plates when said plates are dry, that is to say, at a time when such plates are not susceptible to injury. It is thus obvious that the plates are just as perfectly insulated and spaced apart and said elastic bands safely retained in position after immersion of the plate assembly due to the fact that the bands were placed in position when the plates were dry, as though the bands had been placed on each positive plate after submersion and the plates individually and successfully placed in position in the battery.

Figure 1:
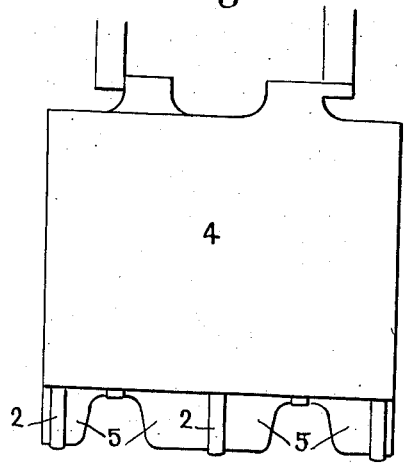
Fig. 1 is a diagrammatical front view of a bundle of positive and negative plates which are to constitute an accumulator or storage battery.
Figure 2:
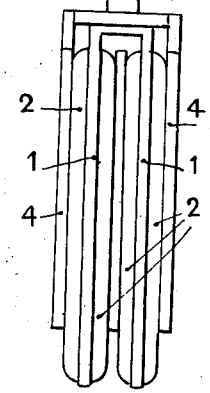
Fig. 2 is an end view of Fig. 1.

In order to procure a reserve of energy once the gasoline motor started, the negative plates 4 are given a dimension which is conveniently smaller than that of positive plates, such positive plates being preferably as pointed out in Fig. 1, lengthened towards their lower end showing thus a part 5 which protrudes over negative plates and constitutes a reserve which does not take part to quick discharges.

If by oversight the storage battery is discharged till exhausted when starting the gasoline motor of a motor-car, the part 5 of the positive plates which is not located in front of the negative plates does not take part in the discharge and remains nearly intact and in a position to furnish the current necessary for the ignition of said motor, once the gasoline motor is started.

It may be said that at such time the negative substance in excess, and the active substance kept in the part 5 of positive plates, constitute in some way a second accumulator which is sufficient for providing an electric current for the ignition of the motor, such ignition requiring a current which is much lower than that of the starting.

Figure 5:
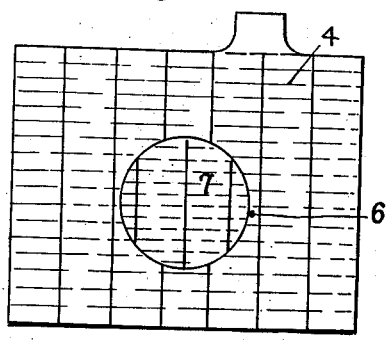
Fig. 5 is a modification of Fig. 1 showing another arrangement of the negative plate for allowing positive plates to offer an area larger than that of negative ones.

The part of positive plates which is not in correspondence or in front of the negative plates, could be located at any convenient part of the surface of such plates, for instance on a lateral side or better as shown in Fig. 5, every negative plate 4 could comprise in a convenient part of its surface an opening 6 the shape of which could be either circular rectangular or otherwise, so that the corresponding part 7 of the adjacent positive plates, is thus left completely disengaged, such part not being brought in action in the case of an intense discharge at the time of starting of the gasoline motor, such part 7 constituting the reserve for the provision of ignition current after starting.

In order to prevent the formation of any short-circuit which would be produced by the dropping of parts of active matter contained in the plates or electrodes, the grids of such electrodes are given sufficiently small dimensions for preventing the fragments of active matter from being retained or wedged between the adjacent plates when falling down. That is to say that the distance apart measured in the vertical direction between two adjacent elements of the grid or armature of a plate of an accumulator is equal or nearly equal to the distance apart which is left between two adjacent accumulator plates in position of operation.

As an example it may be said here that the distance apart of the plates being about 3 to 5 millimeters, the distance apart of the bars or horizontal elements which constitute every grid of an accumulator will be comprised between 3 and 5 millimeters.

The separating elements may be made of any convenient material which may or may not be initially elastic or flexible in character. Such separators could be made of wires or rods, the same being conveniently bent to conform with the shape of the grids and enveloping the same so as to remain applied on both faces of every positive plate, such appliance being made in any convenient manner. A single wire of a non-conductive substance, which could be non-elastic, or a string or band made of any convenient elastic substance may be applied to every face of each positive plate, such parts passing from one side to the other of each plate through convenient perforations.

My invention may be applied to storage batteries of any nature for every application.

What I claim is:—

1. In a storage battery having a plurality of plates of opposite polarity and a plurality of flexible insulating bands interposed between the adjacent plates, the feature of having said flexible insulating bands made of elastic material which in the dry condition of the plates has a predetermined slight tension just sufficient to retain said bands in position upon the plates in dry condition thereof and to completely disappear upon immersion in electrolyte when said plates are immersed therein, in order to avoid strain upon said insulating bands and consequent breakage thereof.

2. In a storage battery having a plurality of plates of opposite polarity and provided with corresponding notches in two opposite edges thereof, and a plurality of flexible and continuous insulating bands, seated in each pair of corresponding notches of said plates so as to surround the latter and space the adjacent plates apart, the feature of having said flexible and continuous insulating bands made of elastic material which in the dry condition of the plates has a predetermined slight tension just sufficient to retain said bands in position upon the plates in dry condition thereof and to completely disappear upon immersion in electrolyte when said plates are immersed therein, in order to avoid strain upon said insulating bands and consequent breakage thereof.

3. In a storage battery having a plurality of plates of opposite polarity and a plurality of flexible insulating bands interposed between the adjacent plates, the feature of having said flexible insulating bands made of caoutchouc, which in the dry condition of the plates has a predetermined slight tension just sufficient to retain said bands in position upon the plates in dry condition thereof and to completely disappear upon immersion in electrolyte when said plates are immersed therein, in order to avoid strain upon said insulating bands and consequent breakage thereof.

4. In a storage battery having a plurality of plates of opposite polarity and provided with corresponding notches in two opposite edges thereof, and a plurality of flexible and continuous insulating bands, seated in each pair of corresponding notches of said plates so as to surround the latter and space the adjacent plates apart, the feature of having said flexible and continuous insulating bands made of caoutchouc, which in the dry condition of the plates has a predetermined slight tension just sufficient to retain said bands in position upon the plates in dry condition thereof and to completely disappear upon immersion in electrolyte when said plates are immersed therein, in order to avoid strain upon said insulating bands and consequent breakage thereof.

PAUL PAUTOU.